Oct. 29, 1929.    J. TAYLOR    1,733,701

AUTOMATIC SPRINKLER OR FIRE EXTINGUISHER

Filed March 9, 1926

J. Taylor
INVENTOR

By: Marks & Clerk
Attys

Patented Oct. 29, 1929

1,733,701

UNITED STATES PATENT OFFICE

JOHN TAYLOR, OF MANCHESTER, ENGLAND

AUTOMATIC SPRINKLER OR FIRE EXTINGUISHER

Application filed March 9, 1926, Serial No. 93,511, and in Great Britain May 27, 1925.

This invention relates to automatic sprinklers or fire extinguishers of the type in which a frangible vessel or bulb made of glass is employed as a strut to support the sprinkler valve, the said vessel or bulb containing volatile or other liquid, which, when sufficiently heated, bursts the vessel, so allowing the sprinkler valve to open.

The use of the said frangible glass vessels or bulbs involves a difficulty due to the conditions to be fulfilled, namely, (1) the vessel or bulb shall provide a strong strut to support the valve and (2) the vessel or bulb shall, when it bursts, be entirely shattered so that the support for the valve is entirely removed and the broken pieces of glass are carried away and do not lodge in the sprinkler deflector which would spoil the water distribution.

The object of my present invention is to provide an improved frangible glass vessel or bulb which shall fully meet the necessary conditions whilst being readily produced.

My invention comprises a frangible glass vessel or bulb produced from a tube which is blown in a suitable mould so as to belly out and thin the tube (which has been previously closed at one end) and make a bulb of barrel shape.

My invention further comprises the formation during the blowing process of a projecting belt-like part around the barrel shaped frangible vessel.

My invention further comprises the drawing out of a glass tube closed at one end and the moulding of the drawn out tube so that it has one or more bulged bands or bellied portions thereon of reduced thickness of glass and flattened portions at one or both ends.

In carrying my invention into effect in one convenient manner, I take a piece of glass tubing of the desired length and close or seal it at one end. The other end can be drawn down to a reduced diameter. The vessel or bulb so formed is then blown in a suitable mould so that its walls are bellied out to produce a vessel of barrel shape. During the blowing process, the thickness of the glass is necessarily reduced, so reducing the strength of the vessel or bulb for resisting bursting pressure. The thinned wall, in conjunction with its increased diameter, which presents a larger area to the bursting pressure, provides a relatively weak belt between the ends of the vessel or bulb which more readily shatters than the remainder of the vessel when bursting of the vessel occurs, thus obviating any tendency of the wall to split in the longitudinal direction as frequently experienced with cylindrical vessels. Blowing the vessel or bulb in a mould has also the important advantage that any striations which may have been formed in the act of drawing the glass tube from which the vessel or bulb is made, are effectively removed and the bulb wall made more homogeneous.

The vessel or bulb is, during moulding, formed with a flat seat at one or both ends for convenience in mounting the vessel or bulb in the sprinkler and for giving stability to it as a strut. A vessel or bulb produced according to my invention has its dimensions true to a high degree of accuracy.

The mould in which the glass tube is blown, as before described, may provide for the formation of projecting cylindrical, helical, or other bands or ribs around the vessel or bulb. As a consequence of the somewhat abrupt change of the contour of the wall of the vessel or bulb where such bands or ribs occur, stresses are induced at these parts which are greater than the normal stress and when the bulb bursts there is a strong tendency for the lines of fracture to follow the said bands or ribs and the possibility of the vessel or bulb splitting longitudinally instead of being completely shattered, is thereby further minimized.

In order to ensure that the pressure imposed on the bulb at its ends when in position in the sprinkler head shall be effectively carried by the flattened ends of the bulb and not by any seam or like raised edge which may be formed due to the blowing of the bulb in a split mold, I may provide a cross groove or recess in the parts which bear upon the ends of the bulb, and in order to facilitate the correct placing of the bulb ends in the said grooved or recessed parts, I may provide for the formation of a marked or substantial ridge or seam across each flat end of a bulb, the said ridge or seam occurring at the position of the split or joint in the mould.

Referring to the accompanying sheet of drawings:—

The same reference letters in the different views indicate the same or similar parts.

The sprinkler comprises a valve $a$ carried by a cap $b$ which rests on the hub $c$ supported by the hollow cone $d$. $e$ is the usual sprayer fitting.

Figure 1:
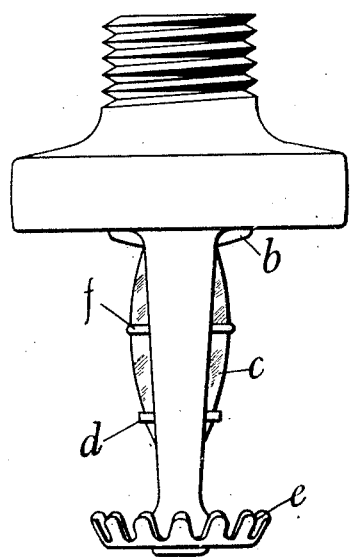
Figure 1 is an elevation and Figure 2 a sectional elevation illustrating a typical sprinkler head in which a frangible vessel or bulb is employed. These figures also show one of my improved bulbs in position in the sprinkler.
Figure 2:
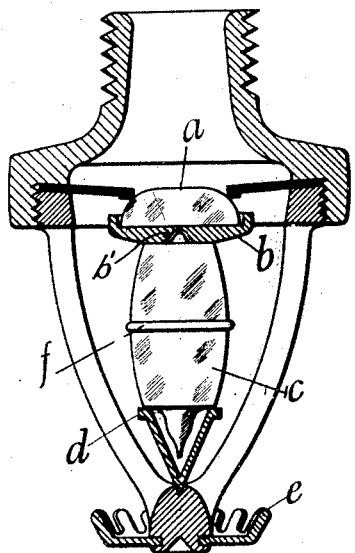

The bulb $c$ shown in Figures 1 and 2 has been produced from a cylindrical piece of glass tube blown in a mould as before described so that it has the barrel shape illustrated. It has also been formed with flat portions at each end to bear against the cap $b$ and the support $d$ and has a belt like projecting ridge $f$ produced during the blowing process, and therefore consisting of thinned material.

Figure 3:
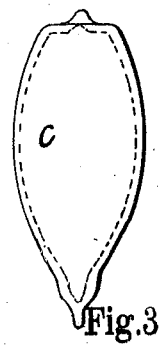
Figures 3 to 7 illustrate five different forms of bulb produced in accordance with my invention.
Figure 4:
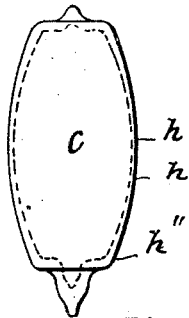
Figure 5:
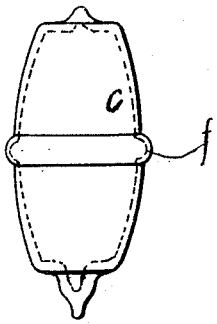
Figure 7:
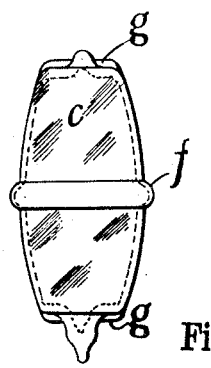

Figures 3, 4, 5 and 7 indicate by the dotted line $h$ how the expansion undergone by the original cylindrical tube thinned the glass to an unequal extent, making it thinnest midway between the flat ends where the stress is received. This thinnest zone extends peripherally around the barrel and is where the glass first yields when burst by expansion of liquid within. In Figure 4 the circumference of the most bulging part of the barrel shape, at $h'$, is about one and a half times the circumference of the part of the same wall $h''$ near the end of the barrel shape. As both were of equal thickness in the original cylindrical stock, that which has become the longer has also become thinned proportionately and constitutes a medial peripheral zone of weakness having only two-thirds the strength of the end portion $h''$ of the same bulge. The glass of the projecting ridge $f$ in Figs. 5, 7 is even thinner, because glass of the same original thickness is there further extended in length. Therefore a growing expansive pressure of contained liquid, uniform in all directions, first becomes able to break the glass in the zone or belt of weakness $h$ or $f$ which runs around the vessel midway between the elements $a$ and $d$, and by breaking the vessel along that zone, in a fracture which does not run in the direction of the strut's compressive stress, ensures that no fragment of glass can be large enough to reach from end to end and thus obstruct the water distribution from valve $a$. In fact, the belt $f$ becoming so abruptly thinner than the wall adjacent to it, makes a tendency for sections of glass to be blown out in the initial breaks in which case the remaining half barrel fragments are thrust together by the pent up water or air behind valve $a$, with a shock which tends the more certainly to shatter both of them into smaller fragments.

In the construction shown in Figure 3, there is a flat portion at one end only of the bulb and the latter has no belt. In Figure 4, the bulb has flattened portions at both ends, as in Figure 2. The bulb shown in Figure 5 resembles that shown in Figure 2.

Figure 6:
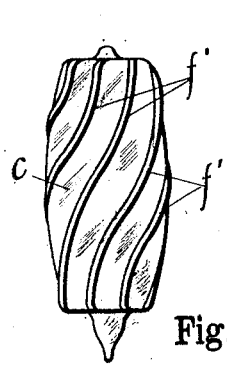

The bulb shown in Figure 6 has helical projecting ribs or bands $f'$ formed therein during blowing for the purpose before referred to.

Figure 8:
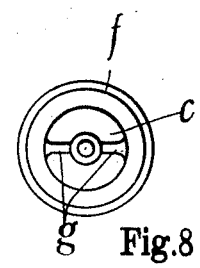
Figure 8 is a plan view of the bulb shown in Figure 7.

In the construction illustrated at Figures 7 and 8, seams or ridges $g$ are formed across the flattened parts of the ends of the bulb at positions which correspond with the joint in the split mould in which the bulb was blown. The said ridges fit in a corresponding recess $b'$ which extends across the cap $b$, and in a similar recess (not shown) provided in the support $d$ by which the bulb is held in position in the sprinkler head. The said cap $b$ and support $d$ only bear upon the flat part of the ends of the bulb, not on the said seams or ridges $g$, so that an even pressure is applied to the glass.

I claim:—

1. A frangible hollow strut, combined with a substance within it which substance is adapted, by expansion, to apply a breaking stress which fractures the wall of the hollow strut, said wall being of barrel shape with an end portion extending inward abruptly toward the axis directly from the end of the bulging part of the wall and constituting a pediment, whereby the compressive stress resisted by the strut may be applied directly to the ends of its bulged wall.

2. A frangible hollow strut having a closed barrel-shaped wall which is progressively thinner from its ends toward its middle.

3. A frangible hollow strut having a closed barrel-shaped wall which is progressively thinner from its ends toward its middle and having at its middle an encircling external ridge whose thickness is less than elsewhere of the barrel.

4. A frangible hollow strut having end sections closed at one end and at their other ends joined together by a ridge section of greater diameter than that of the end sections; the wall of each end section being bellied outward and progressively thinner from its closed end to the ridge section, and the wall of the latter being thinner than the adjoining edges of the bellied walls.

In testimony whereof I have signed my name to this specification.

JOHN TAYLOR.